United States Patent
Kosai et al.

(10) Patent No.: US 10,569,175 B2
(45) Date of Patent: Feb. 25, 2020

(54) SYSTEM AND METHOD FOR SYNCHRONIZING AND PREDICTING GAME DATA FROM GAME VIDEO AND AUDIO DATA

(71) Applicant: Taunt Inc., Seattle, WA (US)

(72) Inventors: Ryan T Kosai, Seattle, WA (US); Ansel C. S. Santosa, Seattle, WA (US); Sean M. Robinson, Burien, WA (US); John B Crenshaw, Seattle, WA (US)

(73) Assignee: Taunt Inc., Seattle, WA (US)

( * ) Notice: Subject to any disclaimer, the term of this patent is extended or adjusted under 35 U.S.C. 154(b) by 0 days.

(21) Appl. No.: 15/887,117

(22) Filed: Feb. 2, 2018

(65) Prior Publication Data

US 2018/0221769 A1   Aug. 9, 2018

Related U.S. Application Data

(60) Provisional application No. 62/454,627, filed on Feb. 3, 2017.

(51) Int. Cl.
*A63F 13/86*   (2014.01)
*G06N 5/04*   (2006.01)
(Continued)

(52) U.S. Cl.
CPC .......... *A63F 13/537* (2014.09); *A63F 13/493* (2014.09); *A63F 13/86* (2014.09);
(Continued)

(58) Field of Classification Search
None
See application file for complete search history.

(56) References Cited

U.S. PATENT DOCUMENTS 9,573,062 B1 *   2/2017   Long ................ H04N 13/117
2008/0312010 A1   12/2008   Marty et al.
(Continued)

OTHER PUBLICATIONS

Int'l Searching Authority—USPTO, "Notification of Transmittal of Int'l Search Report & Written Opinion" dated Apr. 26, 2018; PCT/US2018/016670; pp. 1-11.
(Continued)

*Primary Examiner* — James S. McClellan
*Assistant Examiner* — Peter J Iannuzzi
(74) *Attorney, Agent, or Firm* — Medley, Behrens & Lewis, LLC

(57) ABSTRACT

Systems and methods for capturing and utilizing multimedia-based analytics to generate predictions about game-play in computer-based games and contests. In an embodiment, a video feed analyzes one or more video feeds frame by frame to determine one or more features within each video frame. Each feature may be collected in a central data collector and converted to one or more metrics about each collected parameter or feature. These metrics may be used to analyze and predict various aspects of the underlying game or contest, such as probability of winning by one side or the other. Further, the predictive data and analytical data may be displayed on a display separate from actual gameplay or may be overlaid upon the game play video feed. In this manner, the overlay video may be synchronized with the original video feed to present predictive data in conjunction with the video data used to influence the predictive data at the time.

20 Claims, 7 Drawing Sheets

(51) Int. Cl.
*G06F 17/18* (2006.01)
*A63F 13/537* (2014.01)
*H04N 19/50* (2014.01)
*H04L 29/08* (2006.01)
*A63F 13/493* (2014.01)
*H04L 29/06* (2006.01)

(52) U.S. Cl.
CPC ............... *G06F 17/18* (2013.01); *G06N 5/04* (2013.01); *H04L 67/125* (2013.01); *H04L 67/38* (2013.01); *H04N 19/50* (2014.11); *A63F 2300/535* (2013.01); *A63F 2300/6063* (2013.01)

(56) References Cited

U.S. PATENT DOCUMENTS

| | | | |
|---|---|---|---|
| 2014/0045595 A1 | 2/2014 | Baschnagel, III | |
| 2015/0170467 A1 | 6/2015 | Shore et al. | |
| 2015/0375117 A1* | 12/2015 | Thompson | A63F 13/35 463/9 |
| 2016/0343211 A1 | 11/2016 | Braboyes et al. | |
| 2017/0001111 A1* | 1/2017 | Willette | A63F 13/85 |
| 2017/0069173 A1 | 3/2017 | Shore | |

OTHER PUBLICATIONS

"PCT International Preliminary Report on Patentability for PCT/US2018/016670", dated Aug. 6, 2019, 9 pages.

* cited by examiner

SYSTEM AND METHOD FOR SYNCHRONIZING AND PREDICTING GAME DATA FROM GAME VIDEO AND AUDIO DATA

PRIORITY CLAIM

This application claims the benefit of U.S. Provisional Application No. 62/454,627, entitled "System and Method for Predicting the Outcome of a Game From Video" filed Feb. 3, 2017, which is incorporated by reference in its entirety herein for all purposes.

BACKGROUND

Modern gaming involves a number of participants and a greater number of viewers who may wish to watch the game. Some games or contests may typically involve a group of players working together at one time who are pitted against a group of players on an opposing team. When the game or contest involves computerized gaming, each individual participant may engage the game through a personal computing device that is communicatively coupled to a computer network where one or more server computers may be hosting the game or contest. Such competitive gaming has led to the development and organization of competitive gaming leagues and competitive gaming tournaments. In many ways, competitive computer-based gaming environments are akin to live sporting events wherein two teams compete against each other to achieve specific goals of the game within the rules of the game. Further, fans of such games wish to view the competitive games and tournaments.

As the competitive games and contests are being played, a video feed of aspects of the game or contest may be presented to viewers wishing to follow along with the competitive game. Thus, casual viewers may stream one or more versions of the game feed to a viewer's personal computing device or to an audience viewing the game in group formats. As the computer games being played are governed by specific rules and parameters, a great number of variables exist for judging whether a team or individual is winning or losing. Even the terms "winning" and "losing" are relative in many computer-based games. Thus, watching competitive games and contests may prove to be difficult and cumbersome if the casual viewer does not understand or appreciate various aspects, parameters, and rules of the game.

BRIEF DESCRIPTION OF THE DRAWINGS

Embodiments of the subject matter disclosed herein in accordance with the present disclosure will be described with reference to the drawings, in which.

Note that the same numbers are used throughout the disclosure and figures to reference like components and features.

DETAILED DESCRIPTION

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

By way of an overview, the systems and methods discussed herein may be directed to capturing and utilizing multimedia-based analytics to generate predictions about game-play in games and contests. In an embodiment, a video feed may be analyzed frame by frame to determine one or more features within each video frame. Each feature may be collected in a central data collector and converted to one or more metrics about each collected parameter or feature. These metrics may be used to analyze and predict various aspects of the underlying game or contest, such as probability of winning by one side or the other. Further, the predictive data and analytical data may be displayed on a display separate from actual gameplay or may be overlaid upon the game play video feed. In this manner, the overlay video may be synchronized with the original video feed to present predictive data in conjunction with the video data used to influence the predictive data at the time. These and other aspects of the systems and methods are better understood below with respect to FIG. 1-6.

Figure 1:
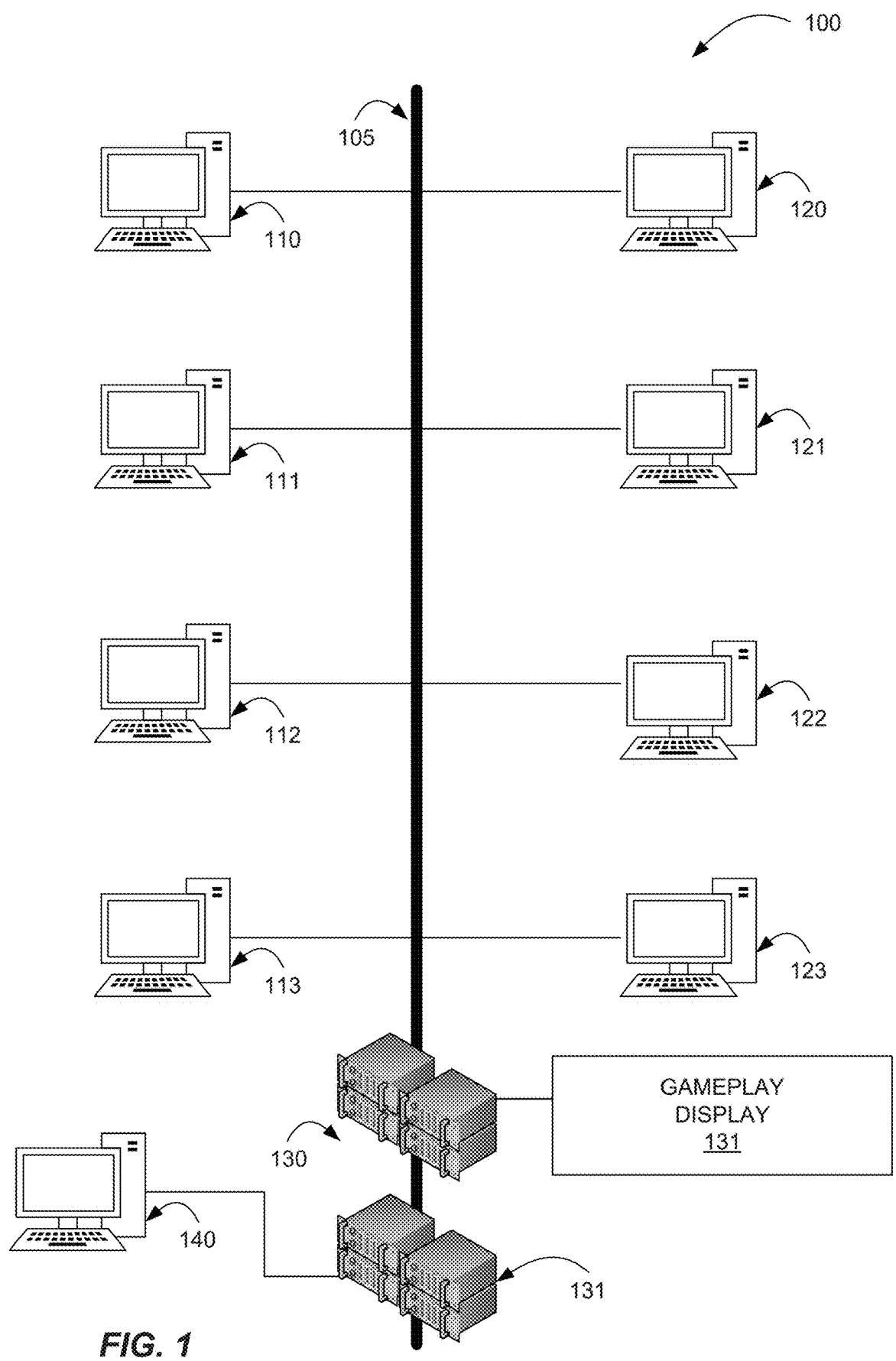
FIG. 1 is a system diagram of computer-based gaming environment that may utilize video-based analytics according to an embodiment of the subject matter disclosed herein.

FIG. 1 is a system diagram of computer-based gaming environment 100 that may utilize video-based analytics according to an embodiment of the subject matter disclosed herein. The environment 100 may include several personal computing devices for game contestants (e.g., computers 110-113 and 120-123) each executing one or more applications thereon and communicatively coupled to each of the other computing devices through a computer network 105, such as the Internet. In an embodiment, the computing devices 110-113 are associated with contestants who are competing on a first team against a second team of contestants respectively using computing devices 120-123. Further, a server computer 130 may also be coupled to the computer network 105 and executing a game application in which each of the contestants using respective computers 110-113 and 120-123 are competing. Each contestant may be presented with a multimedia feed (e.g., audio/video signals, A/V signals) of the gameplay from the respective perspective of the contestant. That is, as a contestant plays the game, each contestant experiences the game from a unique video feed perspective. Each of these respective video feeds may be generated by the game application executing on the server computer 130. Further yet, the server computer 130 may be associated with a local gameplay display 131 that shows one or more of the video feeds that are generated for the respective contestants. In another embodiment, the gameplay display 131 at the server computer 130 may be a unique "omniscient" view or "eye-in-the sky" perspective of the game as the game progresses. Generally, this overhead view may be called an observer point of view. An observer computer 140 may also be communicatively coupled to the computer network 105 so that the observer computer 140 may also render one or more of the video feeds for the game as it progresses.

In various embodiments, the game that is executing at the server computer 130 may be any multiplayer game in which contestants battle or otherwise engage each other in a manner that includes visually cognizable elements. A non-exhaustive list of examples includes Counter-Strike™, Unreal Tournament™, Call of Duty™, Halo™, Dota 2™ League of Legends™, Heroes of the Storm™, StarCraft: Brood War™, StarCraft II™, WarCraft III™, Counter-Strike: Global Offensive™, Counter-Strike, Overwatch™, Halo 5: Guardians™, Call of Duty: Black Ops III™, Tekken 7™, Mortal Kombat X™, Heathstone: Heroes of War-Craft™, Clash Royale™, Magic Online™, and the like. These games have become popular the world over and, as a result, competitive tournaments and leagues have been developed. The popularity extends to generating a viewing audience as well. Thus, fans of these so-called eSports may watch in video-screen arenas or may watch live or quasi-live video streams of gameplay as the game is progressing. The experience of viewers and fans can be improved by providing additional enhanced video analytics as the game progresses. For example, a viewer watching an omniscient view generated at the server computer 130 may benefit from seeing game statistics about gameplay, such as points scored, life remaining, bonuses earned, and the like. Further, utilizing various observable parameters of gameplay, a prediction engine (that may be executing at an analytics server computer 131) may generate real-time or quasi-real-time values indicative or probabilities for teams or players to win or achieve gameplay goals. As discussed next, a computing device may be used to collect video data during gameplay and analyze the collected data based on a variety of parameters and metrics to generate enhanced video analytics to an observer using the observer computing device 140.

Figure 2:
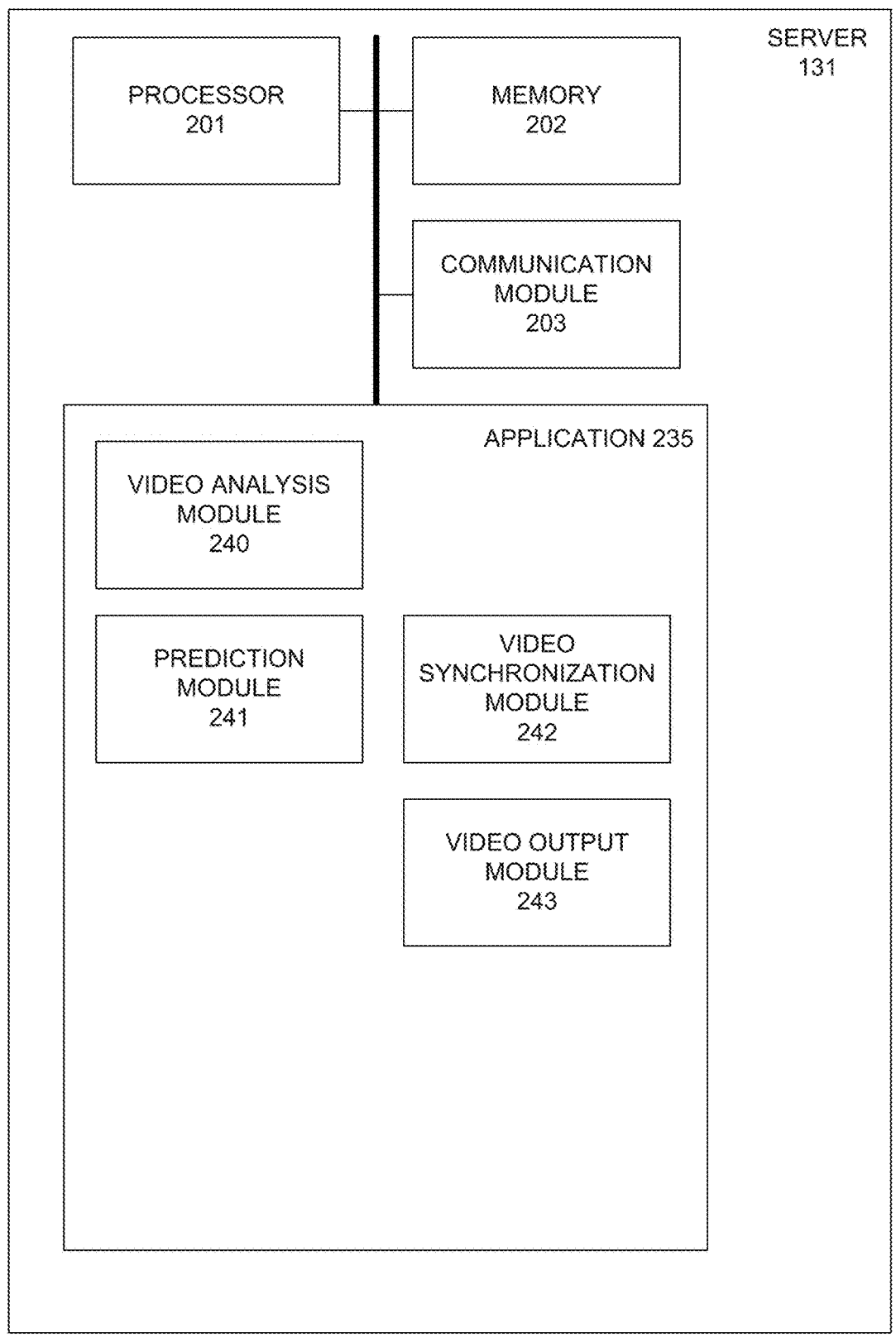
FIG. 2 is a block diagram of a server computer suited to host a computer-based game with enhanced video analytics according to an embodiment of the subject matter disclosed herein.

FIG. 2 is a block diagram of a server computer 131 suited to host a computer-based game with enhanced video and audio analytics according to an embodiment of the subject matter disclosed herein. In this embodiment, the server computer includes one or more processors 201 coupled to one or more memory blocks 202 and configured to execute computer-readable instructions, such as one or more applications. Further, the server computer 131 may include a communication module for communicating with a computer network, such as the Internet. As discussed above, one such executing application may be a video-based analytics application 235. The video-based analytics application 235 may include a video analysis module 240 for receiving and analyzing frames form a video feed to then generate analytical data about the video. Using the analytical data, a prediction module 241 may then generate one or more predictions based on the one or more analytical data sets collected. Then, the generated prediction data may be used in a variety of ways including storage, follow-on analytics and presentation to a video output module 243 for generating a resultant video feed for transmitting to one or more observer computers through the computer network. Further, if the resultant video feed is to be overlaid upon the original video feed, a video synchronization module 242 ensures that the predictive data sets are presented synchronously with the original video feed. The system may also incorporate audio data from the audio/video feeds as a data source and programmatically extract identifying features. This is similar to extracting information from video feed. Therefore, synchronization may also be based on original audio received contemporaneous with original video. Additional aspects of each of these modules are discussed in greater detail below with respect to FIGS. 3-4.

Figure 3:
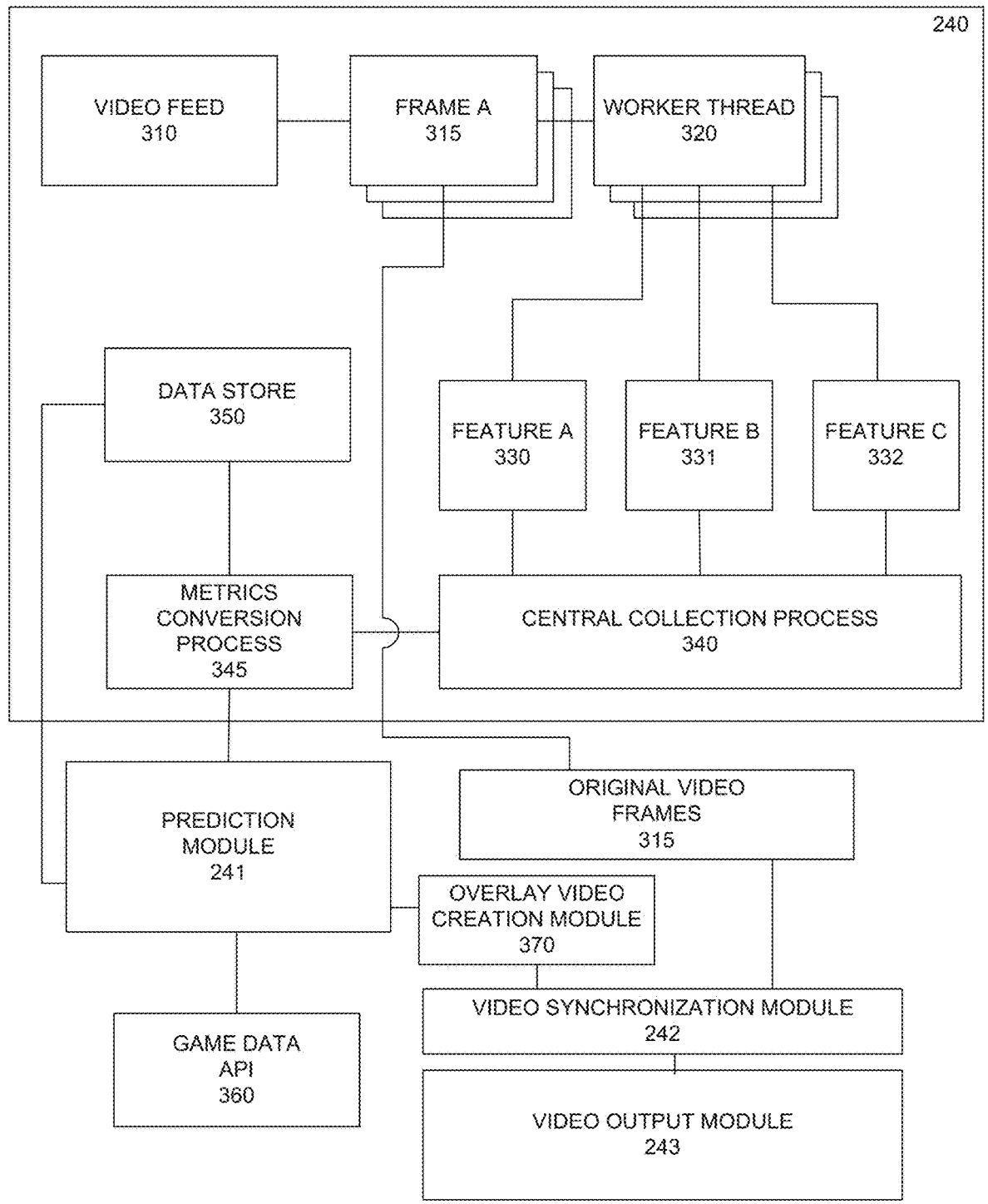
FIG. 3 is a block diagram of various software-based modules for a game enhanced video analytics application according to an embodiment of the subject matter disclosed herein.

FIG. 3 is a block diagram of various software-based modules for an enhanced video analytics application 135 according to an embodiment of the subject matter disclosed herein. The application 135 may execute a computer-based method for receiving one or more audio/video feeds 310 that may be a bounded or unbounded stream of multimedia data, such as one or more input video frames. For the purposes of this embodiment, only the video portions of the feed will be used for illustrative purposes. The received video files may be one or more video files from a local hard disk or files transferred from a remote server. In another embodiment, called HTTP Live Streaming ("HLS", https://tools.ietf.org/html/draft-pantos-http-live-streaming-20), a playlist file may define multimedia assets. The video feed(s) may be of a computer-based game that is executing remotely from the video-based analytics application 135. As such, in the case of multiple video feeds of a single game being played by multiple players (each possibly in different remote locations, the multiple video feeds are partial views of the overall game. That is, each video feed may correspond to a current view of each individual player. In other embodiments, the video feed may be a live sporting event.

The application 135 may ingest video frames at a faster rate than normally consumed by a human. In some cases, this may operate in violation of the advisement of the protocol, with the goal of retrieving frame data as quickly as possible. In another embodiment, the video frames are captured directly from a system observing or playing the game through a dedicated application programming interface (API).

For each video frame 315, the frame contents and metadata may be sent to one or more worker processes or threads 320. In some cases, the application 135 may ignore some video frames deemed unnecessary for producing an accurate accounting the game. Each worker thread 320 may programmatically extract identifying features (e.g., feature A 330, feature B 331, and feature C 332) from the video stream in software. Such features may include, for example, player health, player mana, player level, player alive/dead status, character name, number of towers down, cumulative gold earned per team, number of kills per team, tower alive/dead status, player creep score, number of player kills, number of player deaths, number of player assists, items purchased by players, whether a replay is in progress, minimap location and dimensions on screen, time elapsed in game, item cooldown remaining, spell cooldown remaining, player position on screen, player position on map, ward position on map, % map visibility per team, key character position on map, key character kills per team, and the like. This may be performed using "computer vision" techniques, including but not limited to template matching, edge detection, corner detection, feature detection, and deep neural networks. Worker threads 320 may report data to a central collection process 340. Because each worker thread 320 may complete its processing in a differing amount of time, the application 235 may reassemble the centrally collected data into a stream of features ordered by timestamp or other ordinal value.

The application 235 may also convert the collected stream of computer vision features into descriptive metrics, including descriptions of game state, counters, aggregate statistics, and in-game events. These descriptive metrics may be calculated from features from a single frame, or be stateful and derive their value from a series of frames over time. Various metrics may be generated at a metrics conversion process 345. These metrics may be stored in a local data store 350.

The metrics data may be fed to a prediction module 241, which may comprise a classification method utilizing supervised machine learning. Embodiments may utilize techniques including a rules engine, SVD, kNN, random forests, logistic regression, neural networks. The output of this mechanism may include an ordinal or probability to the occurrence of game events, including but not limited to the outcome of the game, the destruction of in-game objects, player deaths, and player actions. The prediction module 241 may utilize prior or historical data in its operation by drawing metrics data from the local data store 350. This data may include the features or descriptive statistics produced by this application 235 on past games, or be procured through other means. In one embodiment, the descriptive statistics are acquired via an API 360 from the publisher of the game.

The application 235 may include a module 370 to produce displayable odds in real-time, suitable for informing wagers, and supporting bookmaking operations. The real-time odds may be calculated based on relative probabilities of multiple predicted outcomes, utilizing either the output of the prediction module 241, the descriptive statistics, or the stream of features.

The application 235 may include a module 242 to synchronize the odds and events to a video stream meant for human consumption. Because the application 235 may operate on video frames faster than real-time, and because video streams may need to be stored in an input buffer prior to human consumption, the prediction module 241 and odds production may otherwise produce results ahead of the associated video stream.

In some cases, the source video playlist may include a header or other metadata indicating the start time of the stream. The application 235 may store this timestamp in conjunction with the feature data, derived stats, predicted outcomes, or displayable odds (generally, "the stats data"). In the cases that the source video playlist does not include this header, the application 235 may add a timing header to the video stream using a proxy or other module.

The application 235 may synchronize and integrate data with the video stream using a queue mechanism in a video output module 243. In an embodiment, this module may initiate the process where data is sent to the client with a timestamp or other monotonic identifier. Either the client or server is responsible for ensuring the data is stored in an ordered data structure such as a queue or stack, ordered by timestamp or other monotonically increasing identifier. Periodically, the current timestamp on the video is compared with the timestamp on the first segment of data in the queue. If the current timestamp on the video is later than on the queue, the data is removed from the queue and displayed in conjunction with the video stream. In some cases, the video stream may be an on-demand video that includes support for seeking within a video file. In this case, the system may include a queue of queues to improve the efficiency of seeking forward.

In another embodiment, the application 235 may attempt to produce a restructured game state from partial data that is collected from the several video feeds. This game state may be displayed to the user synchronized with predictions or be used as part of the predictive mechanism itself in extracting further collective data about the underlying game. Such a restructured game state and/or stream of events may be further augmented with data from other sources, such as a third party viewer (e.g., not one of the players of the game) before or after the prediction phase. Further yet, in one embodiment, additional data may be manually generated from a user interface by a human watching or playing the game.

With the ability to predict one or more outcomes of an in-progress game, third-party viewers may engage in "wagers" based on predictions of various outcomes. Such wagers may be free from actual money exchanges and be more focused on gaining game points or game credentials in lieu of money-wagering. As such, an additional output of the predictive mechanism may be a stream of wagers or "challenges" identified as interesting at a given time. For example, a challenge may be presented that a specific player would gain a specific power-up in the game prior to any other player. Third-party watchers could accept the challenge in the affirmative or negative, thereby wagering game points on the prediction of such an outcome. If multiple challenges are identified as interesting at overlapping timestamps, a mechanism may be in place to prioritize the challenges. Some challenges may be accepted by more than one player/viewer. Others may be exclusive to the first player/watcher to take the challenge. Challenges may be fulfilled/resolved either using the generated data stream, game state, predictive output, or by a human intervention as described above. As a supplement, a user-facing video presentation may show statistics, challenges, and game state information without an accompanying game-play video feed. In this embodiment, users may watch the actual game on an external device and the prediction data may be displayed on a different viewing device. In other embodiments, the prediction data may be superimposed and synchronized by aligning audible data from the external device with audio data features identified from the main video processing pipeline.

Figure 4:
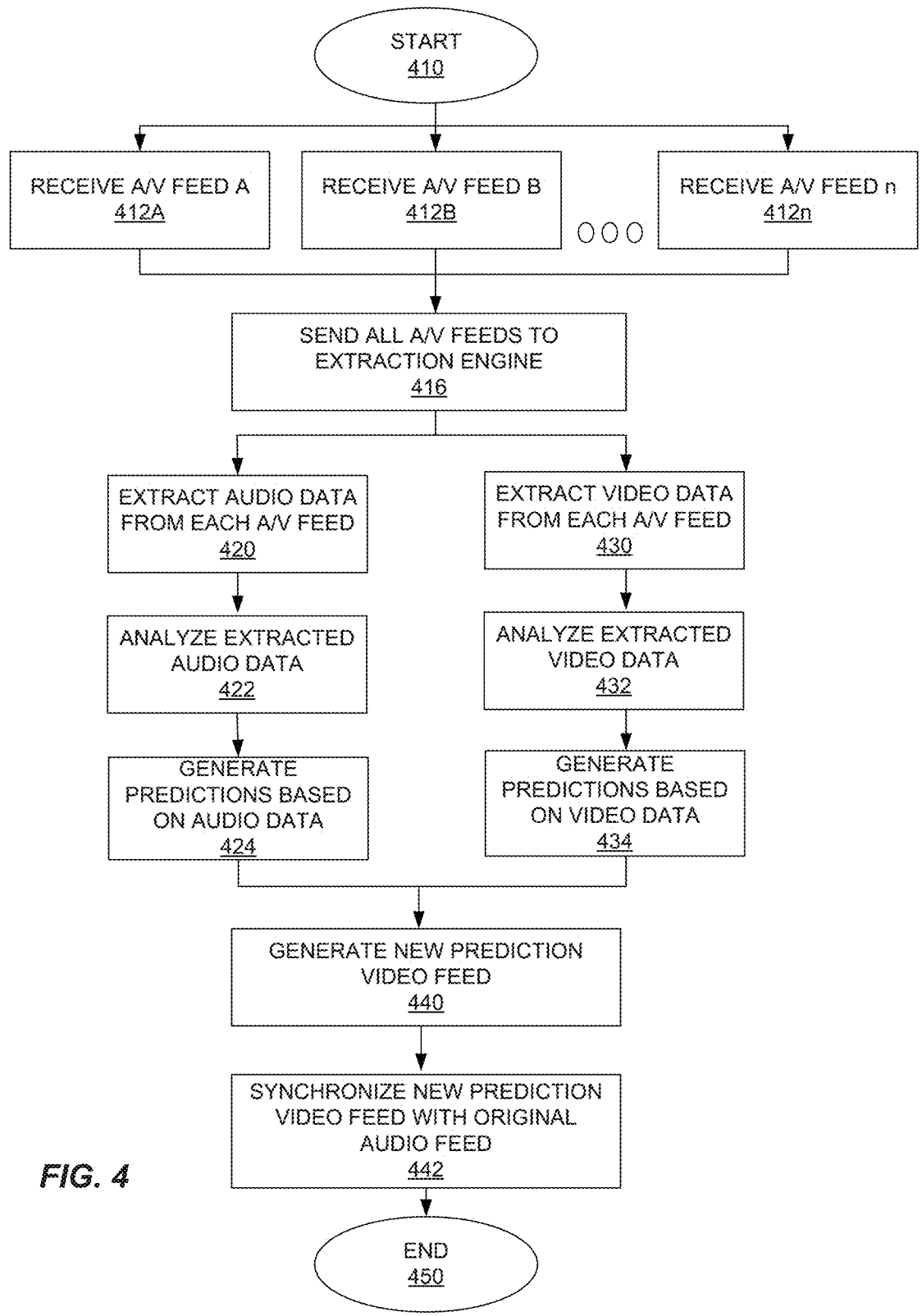
FIG. 4 is a flow diagram of a method prediction game outcomes using a game enhanced video analytics application according to an embodiment of the subject matter disclosed herein.

FIG. 4 is a flow diagram of a method prediction game outcomes using a game enhanced video analytics application according to an embodiment of the subject matter disclosed herein. A skilled artisan understands that the steps of this embodiment may be performed in different orders and may involve more or fewer steps. This illustration of one embodiment here is presented for a better understanding of the underlying blocks and modules of the overall analytics engine.

The method may start at step 410 when a user may engage the overall prediction engine of the application 235 as described above with respect to FIGS. 2-3. As such, one or more audio/video feeds may be received at steps 412A, 412B . . . 412n, where n represents n number of A/V feeds (e.g., multimedia signals) coming into the application 235. All A/V feeds are sent to an extraction engine at step 416 where the audio feed may be extracted and manipulated separately from the videos feed, respectively. Thus, the video data may be extracted from a first A/V feed at step 430. The extracted video data, which may be alphanumeric indicators in any given video screen capture or other indicia, like a player health or mana bar, is then sent to an analysis module where individual extracted data from the specific video feed is analyzed at step 432. Based on the analysis in step 432, one or more predictions may be made at step 434. Such predictions may be assimilated in the aggregate with several other analyses of extracted video data in contemporaneous time as discussed above with respect to the prediction module 241 of FIG. 3.

Similarly, audio data may be extracted from the first A/V feed at step 420. The extracted audio data, which may be audio indicators in any given game schema, like a player death or objective accomplishment, is then sent to an analysis module where individual extracted data from the specific audio feed is analyzed at step 422. Based on the analysis in step 422, one or more predictions may be made at step 424. Such predictions may be assimilated in the aggregate with several other analyses of extracted audio data in contemporaneous time as discussed above with respect to the prediction module 241 of FIG. 3. In some embodiments, the audio data is less utilized in the prediction module or in some cases, not at all, in the prediction module.

Once all data is assimilated into the prediction module, an overall display of the results of the prediction may be presented to an external display at step 440. Such a data display may be a conglomerate assimilation of game data whereby a new "omniscient" view of the underlying game is created. In other embodiments, the additional prediction video feed may be overlaid over one or more individual A/V feeds that were received in steps 412A, 412B . . . 412n. As any prediction data may be presented contemporaneously with any original data from the original A/V feeds, a synchronization is enacted at step 442. Such a synchronization may be done using the original audio feed from one or more original A/V feeds as the audio is the game is synchronized with respect to all video feeds in the first place. The method may end at step 450 or repeat continuously to update prediction with newly extracted data.

Figure 5:
FIG. 5 is a screen shot of gameplay for a game showing an unenhanced view of gameplay prior to the display of enhanced video analytics according to an embodiment of the subject matter disclosed herein.

FIG. 5 is a screen shot 500 of gameplay for a game showing an unenhanced view of gameplay prior to the display of enhanced video analytics according to an embodiment of the subject matter disclosed herein. This example screen shot 500 may represent one individual player's game screen in which initial audio and video may be extracted for predictions of outcomes. In this screen shot 500, two players are engaged in competitive play against one another. Limited information is shown about various in-game statistics that are representative of only this player's knowledge. The screen shot 500 shown in FIG. 5 is an example of a frame of a video feed that may be analyzed for various parameters and features. For example, one feature may be a health bar 520 shown for a gameplay character or recognition of accomplishment of an objective. Another example may be teammates statistics 510 shown on the side of the screen. Another example may be game statistics 515 as shown as the top of the screen. As features and parameters are identified and captured, an overlay may be generated with predictive data as shown in FIG. 6.

Figure 6:
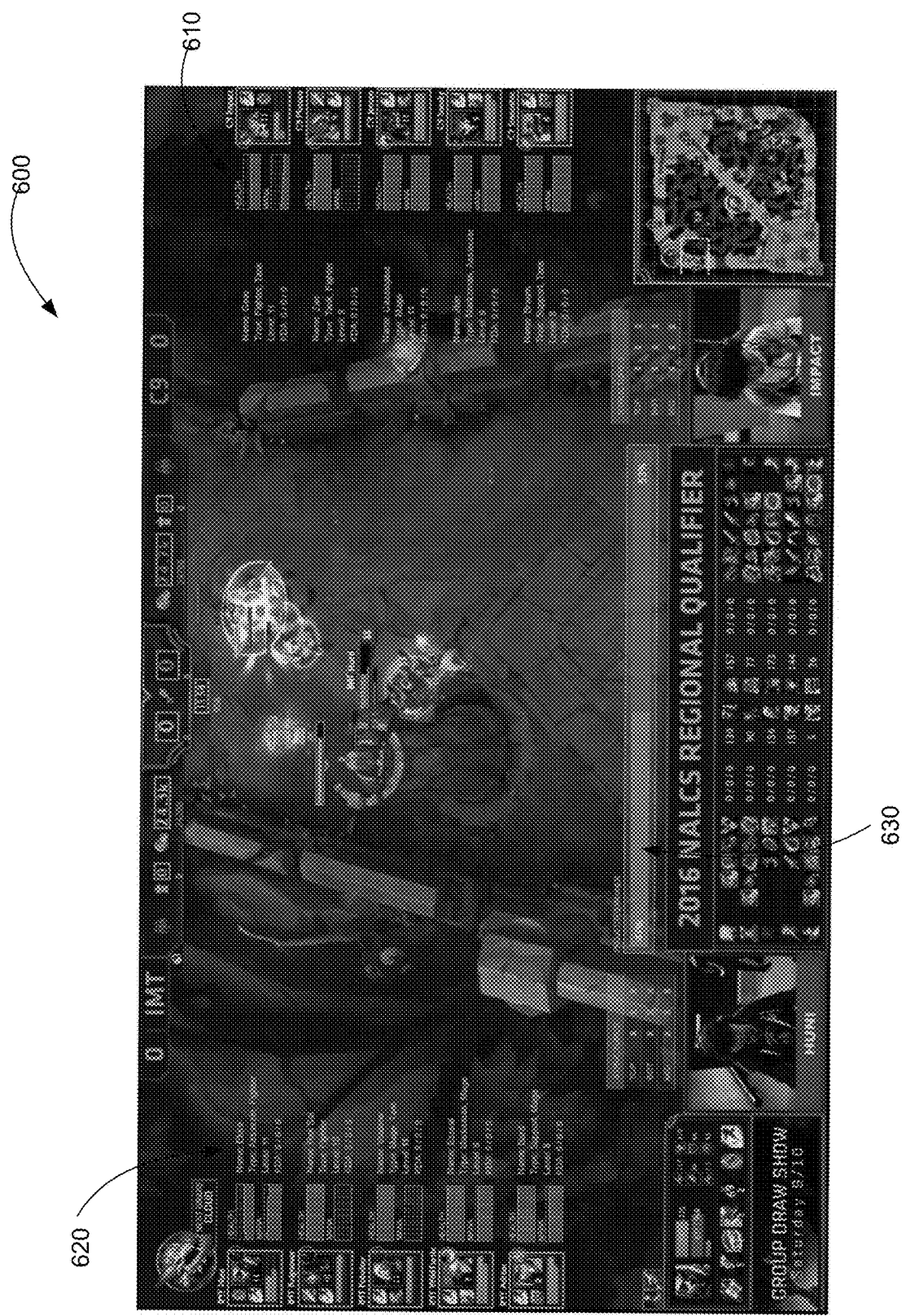
FIG. 6 is a screen shot of gameplay for a game showing an enhanced view of gameplay utilizing display of enhanced video analytics according to an embodiment of the subject matter disclosed herein.

FIG. 6 is a screen shot 600 of gameplay for a game showing an enhanced view of gameplay utilizing display of enhanced video analytics according to an embodiment of the subject matter disclosed herein. This view shows an overlay 610 and 620 of analytical data synchronized with the original video feed. Thus, each character includes health and mana measurements. Further, current remaining structures (e.g., objectives) may be shown. Further yet, a prediction data is shown in the way of a predicted winner status bar 630. Other embodiments of various prediction parameters may be shown in other embodiments of screen shots not shown here for brevity.

Figure 7:
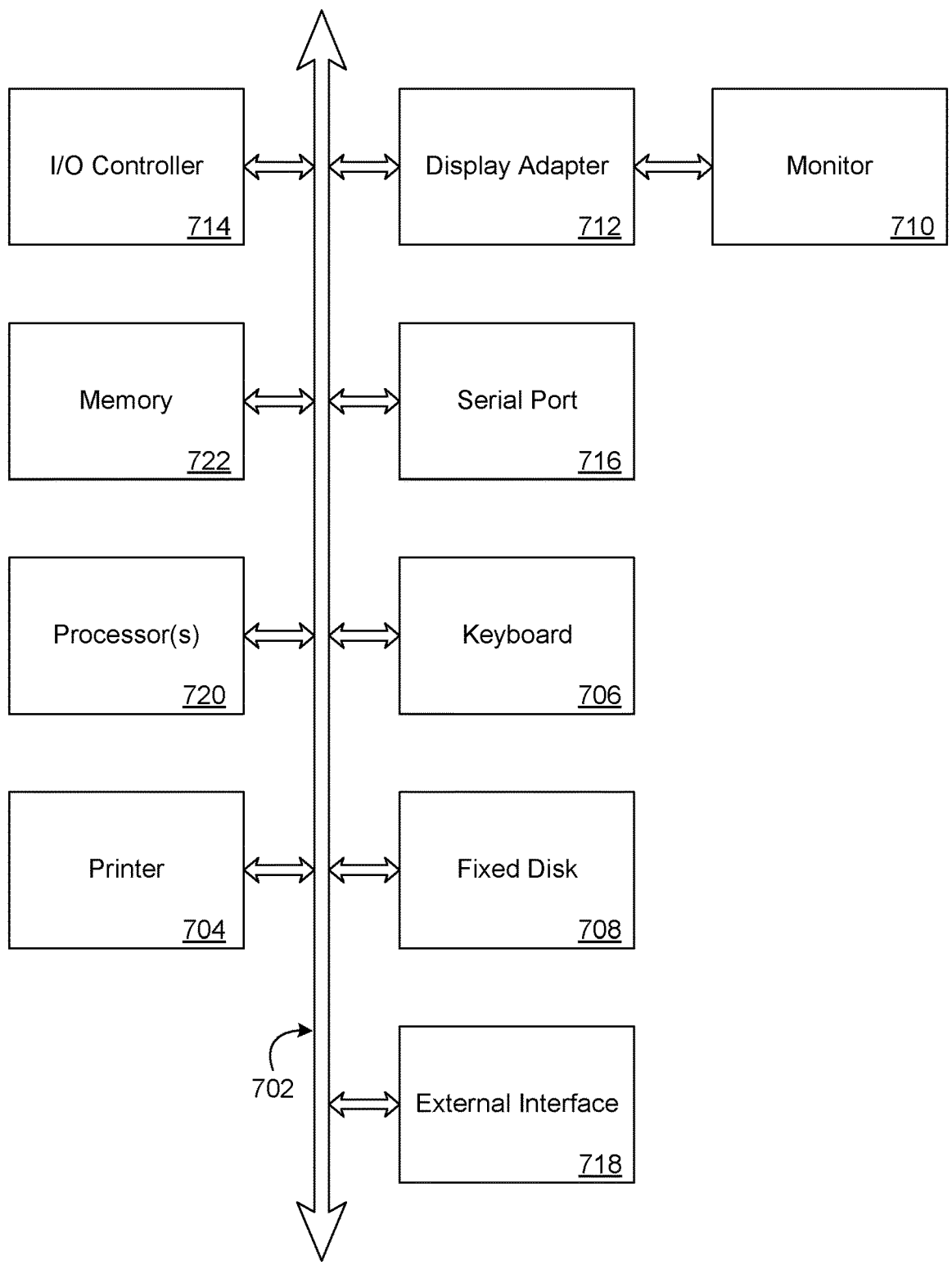
FIG. 7 is a diagram illustrating elements or components that may be present in a computer device or system configured to implement a method, process, function, or operation in accordance with an embodiment.

FIG. 7 is a diagram illustrating elements or components that may be present in a computer device or system configured to implement a method, process, function, or operation in accordance with an embodiment. In accordance with one or more embodiments, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a master control unit (MCU), central processing unit (CPU), or microprocessor. Such processors may be incorporated in an apparatus, server, client or other computing or data processing device operated by, or in communication with, other components of the system. As an example, FIG. 7 is a diagram illustrating elements or components that may be present in a computer device or system 700 configured to implement a method, process, function, or operation in accordance with an embodiment. The subsystems shown in FIG. 7 are interconnected via a system bus 702. Additional subsystems include a printer 704, a keyboard 706, a fixed disk 708, and a monitor 710, which is coupled to a display adapter 712. Peripherals and input/output (I/O) devices, which couple to an I/O controller 714, can be connected to the computer system by any number of means known in the art, such as a serial port 616. For example, the serial port 716 or an external interface 718 can be utilized to connect the computer device 700 to further devices and/or systems not shown in FIG. 7 including a wide area network such as the Internet, a mouse input device, and/or a scanner. The interconnection via the system bus 702 allows one or more processors 720 to communicate with each subsystem and to control the execution of instructions that may be stored in a system memory 722 and/or the fixed disk 708, as well as the exchange of information between subsystems. The system memory 722 and/or the fixed disk 708 may embody a tangible computer-readable medium.

It should be understood that the present disclosures as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Assembly language Java, JavaScript, C, C++ or Perl using, for example, conventional or object-oriented techniques. The software code may be stored as a series of instructions, or commands on a computer readable medium, such as a random-access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

That which is claimed is:

1. A computer-based device, comprising:
   a data receiver module for receiving video data from one or more external sources, the video data comprises gameplay video frames depicting views of gameplay of a computer-based game from one or more perspectives, the gameplay video frames of the video data containing underlying game data indicative of the computer-based game being played in sequential time;
   a video analysis module coupled to the data receiver module and configured to extract the underlying game data from the gameplay video frames of the video data and further configured to store the extracted game data in a data store, the video analysis module being configured to analyze the video data on a frame-by-frame basis using one or more computer vision techniques on the gameplay video frames to extract the underlying game data from the gameplay video frames;
   a prediction module coupled to the video analysis module and configured to analyze the extracted game data in sequential time and to generate predictions of one or more game outcomes corresponding to the computer-based game; and
   an output module coupled to the prediction module and configured to generate an output having one or more aspects of the received video data and one or more aspects of the generated predictions.

2. The computer-based device of claim 1, further comprising a game data application programming interface coupled to the prediction module and configured to receive differing game data from the computer-based game that is different from the extracted game data extracted from the gameplay video frames of the video data, wherein the prediction module is configured to analyze the differing game data and the extracted game data to generate the predictions of the one or more game outcomes.

3. The computer-based device of claim 1, further comprising a synchronization module coupled to the prediction module and configured to synchronize the generated predictions with the output.

4. The computer-based device of claim 3, wherein the synchronization module further comprises an audio synchronization module configured to synchronize the generated predictions with the output based on audio cues in the output.

5. The computer-based system of claim 1, further comprising an audio input module coupled to the receiver module and configured to extract gameplay audio data from a feed that comprises the video data and further configured to send the extracted gameplay audio data to the prediction module, wherein the prediction module is configured to analyze the extracted gameplay audio data to generate the predictions of the one or more game outcomes.

6. The computer-based device of claim 1, further comprising an overlay video creation module coupled to the prediction module and configured to overlay the generated predictions onto the received video data for sending as the output.

7. The computer-based device of claim 1, further comprising one or more metrics conversion modules coupled to the prediction module and configured to convert a stream of computer vision features collected using the one or more computer vision techniques to metrics data, wherein the prediction module is configured to generate the predictions of the one or more game outcomes based on the metrics data.

8. A computer-based system, comprising:
   a first gaming computer coupled to a computer network and having a game executable thereon;
   a second gaming computer coupled to the computer network and having the game executable thereon simultaneous to the execution of the game on the first gaming computer; and
   a server computer coupled to the computer network and configured to communicate with the first gaming computer and the second gaming computer while the game is executing at the first gaming computer and the second gaming computer, the server computer including:
      a data receiver module for receiving video data from the first and second gaming computers, the video data comprises gameplay video frames depicting views of gameplay of the game generated by at least the first gaming computer and the second gaming computer, the gameplay video frames of the video data containing underlying game data indicative of the game executing in sequential time;

a video analysis module coupled to the data receiver module and configured to extract the underlying game data from the gameplay video frames of the video data and further configured to store the extracted game data in a data store, the video analysis module being configured to analyze the video data on a frame-by-frame basis using one or more computer vision techniques on the gameplay video frames to extract the underlying game data from the gameplay video frames;

a prediction module coupled to the video analysis module and configured to analyze the extracted game data in sequential time and to generate predictions of one or more game outcomes corresponding to the game; and an output module coupled to the prediction module and configured to generate an output having one or more aspects of the received video data and one or more aspects of the generated predictions.

9. The computer-based system of claim 8, further comprising:

a third gaming computer coupled to the computer network and having the game executable thereon simultaneous to the execution of the game on the first gaming computer and the second gaming computer;

wherein the server computer is further configured to receive video data from the third gaming computer and configured to influence the predictions in response to video data received from the third gaming computer.

10. The computer-based system of claim 8, further comprising an observer computer coupled to the computer network, the observer computer configured to receive an output video feed simultaneous to the execution of the game at the first and second gaming computers and configured to display the output on a display.

11. The computer-based system of claim 8, wherein the server computer further comprises a video display configured to display an output video feed simultaneous to the execution of the game at the first and second gaming computers.

12. The computer-based system of claim 8, wherein the server computer further comprises a challenge management module configured to manage challenges related to the game simultaneous to the execution of the game on the first and second gaming computers.

13. A computer method, comprising:

receiving a multimedia signal from a remote computer system having a game being executed thereon, the game having an outcome based on gameplay, the multimedia signal comprises gameplay video frames depicting a view of the gameplay for the remote computer system;

extracting game data from the multimedia signal, the game data being extracted from the multimedia signal by preforming one or more computer vision techniques on the gameplay video frames of the multimedia signal on a frame-by-frame basis;

assimilating the extracted game data into a game analytics engine for analyzing the gameplay; and generating a prediction of a game outcome in response to the analyzing.

14. The computer method of claim 13, further comprising generating a prediction video signal having aspects of the received multimedia signal and having aspects of the prediction.

15. The computer method of claim 14, further comprising synchronizing the aspects of the prediction with the received multimedia signal using extracted audio data from the received multimedia signal.

16. The computer method of claim 13, wherein the extracting game data further comprises identifying a graphical portion of a particular gameplay video frame included in the multimedia signal indicative of a game statistic by preforming the one or more computer vision techniques on the particular gameplay video frame and determining the game data from the identified graphical portion.

17. The computer method of claim 13, wherein the extracting game data further comprises identifying an alphanumeric portion of a particular gameplay video frame included in the multimedia signal indicative of a game statistic by performing the one or more computer vision techniques on the particular gameplay video frame and determining the game data from the identified alphanumeric portion.

18. The computer method of claim 13, wherein the extracting game data further comprises identifying an audio portion of the multimedia signal indicative of a game statistic and determining the game data from the identified audio portion.

19. The computer method of claim 13, further comprising:

receiving a second multimedia signal from a second remote computer system having the game being executed thereon, the second multimedia signal comprises second gameplay video frames depicting a second view of the gameplay for the second remote computer system;

extracting second game data from the second multimedia signal, the second game data being extracted from the second multimedia signal by preforming the one or more computer vision techniques on the second gameplay video frames of the second multimedia signal on a frame-by-frame basis;

assimilating the extracted second game data from the second multimedia signal into the game analytics engine for analyzing the gameplay; and influencing the prediction of the game outcome in response to the analyzing of the extracted second game data from the second multimedia signal.

20. The computer method of claim 19, further comprising:

aggregating each multimedia signal and each prediction to generate an omniscient multimedia signal having aspects of each multimedia signal and each prediction; and transmitting the omniscient multimedia signal to a third remote computer system.

* * * * *